United States Patent [19]

Okuyama et al.

[11] Patent Number: 5,208,608
[45] Date of Patent: May 4, 1993

[54] PLOTTER WITH DRAWING SPEED CHANGE

[75] Inventors: Takashi Okuyama; Toshitaka Yoshimura, both of Tokyo, Japan

[73] Assignee: Asahi Kogaku Kogyo Kabushiki Kaisha, Tokyo, Japan

[21] Appl. No.: 891,917

[22] Filed: Jun. 1, 1992

Related U.S. Application Data

[63] Continuation of Ser. No. 472,876, Jan. 31, 1990, abandoned.

[30] Foreign Application Priority Data

Jan. 31, 1989 [JP] Japan .................................. 1-19678

[51] Int. Cl.[5] .............................................. H04N 1/21
[52] U.S. Cl. ..................... 346/108; 358/296
[58] Field of Search .................. 346/108, 107 R, 160, 346/76 L; 358/296, 300, 302

[56] References Cited

U.S. PATENT DOCUMENTS

| 4,203,154 | 5/1980 | Lampson et al. | 364/200 |
| 4,942,406 | 7/1990 | Tsuda | 346/108 |
| 4,958,299 | 9/1990 | Akada | 364/520 |

Primary Examiner—Mark J. Reinhart
Attorney, Agent, or Firm—Sandler Greenblum & Bernstein

[57] ABSTRACT

A plotter system has a data converting portion for converting image data to raster data. An intermediate memory temporarily stores the converted data, while a plot portion draws an image based upon the data outputted from the intermediate memory.

19 Claims, 4 Drawing Sheets

FIG. I

PLOTTER WITH DRAWING SPEED CHANGE

This application is a continuation of application Ser. No. 07/472,876, filed Jan. 31, 1990, now abandoned.

BACKGROUND OF THE INVENTION

1. Field of the Invention

This invention relates to an improvement for a plotter system for temporarily storing image data in an intermediate memory and then transmitting it to an image forming portion.

2. Description of the Prior Art

As a system of this type, there have been used apparatus, such as, for example, a laser photo plotter. Such an apparatus comprises a raster engine for converting image data to raster data, and a plot portion for drawing a pattern on an image drawing surface, based on the converted data.

Because the conventional plotter system directly inputs the data from the raster engine to the plot portion, it is required that the raster engine and the plot portion be operated in synchronism. When the raster engine and the plot portion are operated in synchronism, the processing speed of the whole system is restricted by either the raster engine or the plot portion, which has a lower capacity.

In a general plotter system, drawing the capacity of the plot portion is higher than the data conversion capacity of the raster engine, and the processing speed of the whole plotter system is decided by the capacity of the raster engine.

The activation of the plot portion is sometimes stopped, for example when the drawing portion is switched. In such a case, the conventional system stops the activation of the raster engine.

However, it is not desirable to stop the activation of the raster engine, which has a low processing capacity, in view enhancement of the processing speed of the system.

SUMMARY OF THE INVENTION

A plotter system according to the present invention is characterized in that it has an intermediate memory for accumulating data between a data converting portion, for converting an image data to a raster data, and a plot portion, for drawing an image based on the converted data.

According to the above-mentioned construction, the activation of the data converting portion is not required to be synchronized with the activation of the plotter portion, and the average processing speed of the data converting portion can be enhanced by causing the engine to function so as to accumulate data in the intermediate memory. The expression "average processing speed of the data converting portion" refers to a speed including the processing within the stopping time of the plot portion which stops processing in the prior art and does not mean the change of the processing capacity itself of the data converting portion.

Accordingly, the processing speed of the plot portion can be established to a level higher than the processing capacity of the data converting portion and the processing speed of the whole system can be improved.

However, as the processing capacity of the plot portion is higher than the processing capacity of the plot portion, in case the processing speed of the plot portion is greatly higher than that of the data converting portion, the data accumulated in the intermediate memory, while the plot portion is being stopped owing to the switching of the drawing portion, becomes zero at a stage before next switching and there arises a necessity to stop the activation of the plot portion at the request of the data converting portion.

Therefore, a plotter system according to the present invention includes, in addition to the above-mentioned construction, data remainder detecting means for detecting a data amount accumulated in an intermediate memory, and a drawing speed control means for increasing a drawing speed of a plot portion when the data remainder is large, based on information from the data remainder detecting means and decreasing the drawing speed when the data remainder is small, processing speed of the plot portion being changed in accordance with the data remainder within the intermediate memory.

DETAILED DESCRIPTION OF THE EMBODIMENTS

Figure 1:
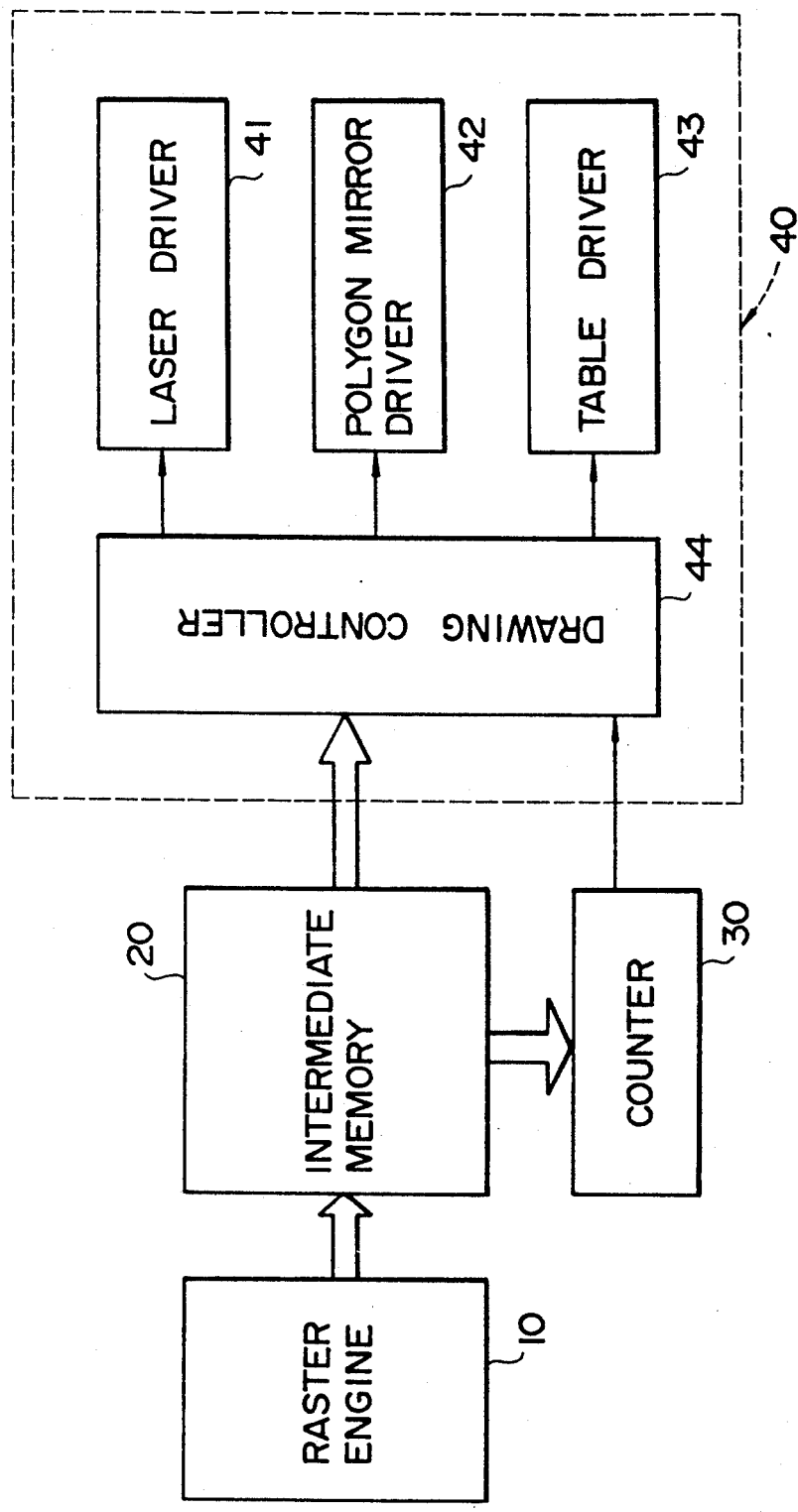
FIG. 1 is a block diagram showing a control system of an apparatus of one embodiment of a plotter system according to the present invention.

The present invention will be described hereinafter with reference to the drawings. FIGS. 1 through 4 show one embodiment of the present invention.

The plotter system of the present invention comprises a raster engine 10 that functions as a data converting portion for converting raster data, an intermediate memory 20 for temporarily storing the converted data, a data remainder detecting means, such as counter 30, for detecting a data remainder stored in the intermediate memory 20, and a laser photo plotter 40 that functions as a plot portion for drawing an image based upon data from the intermediate memory 20.

The intermediate memory 20 is of a first-in, first-out type memory.

The counter 30 is adapted to split the whole address of the intermediate memory 20 into 16 portions $O_H$–$F_H$ (hexadecimal), detecting a memory remainder by checking whether data is in each address, and managing the memory remainder as 4 bit information.

The means for detecting the data remainder within the intermediate memory may be an up-down counter for counting a data amount input into the intermediate memory 20 and a data amount output therefrom.

The laser plotter 40 includes a laser driver 41 for driving a laser, a polygon mirror driver 42 for rotating a polygon mirror and scanning a laser beam, a table driving table 43 for moving a photosensitive plate to draw an object in a direction perpendicular to the laser scanning direction, and a drawing controller 44 for controlling the above-mentioned component elements. The laser beam, while being ON/OFF controlled by the laser driver 41, is scanned by the polygon mirror to form a two-dimensional exposure pattern on the photosensitive plate which is moved by the table driver 43.

The drawing controller 44 also functions as a drawing speed control means for regulating a drawing speed based upon data from the counter 30 and selects one of four stages (1/1, ½, ¼ and ⅛) of speed data transmission corresponding to the amount of data remaining in the intermediate memory 20. A method for generating the speed data will be described below.

One of the methods for changing the drawing speed is to decrease the laser scanning speed and the table moving speed at the same rate.

However, it is not easy to change the rotational speed of the polygon mirror in order to change the laser scanning speed.

In the present system, therefore, the speed regulation is realized by changing the transferring speed of the table and the scanning times per unit time while maintaining constant the rotational speed of the polygon mirror. A method for changing the scanning times per unit time without changing the speed of rotation of the polygon mirror is to scan a laser beam by using a reflecting surface of the polygon mirror every 1~7 surfaces when the speed of the polygon mirror is decreased.

However, as the space of the scanning lines which the laser beam scans is required to be constant, irrespective of the drawing speed, the table moving amount between the adjacent scanning lines represented by the product between the timewise interval of the scanning and the distancewise interval of the table movement is established to be constant.

That is, in case the transferring speed of the table is 1/1, the drawing is performed using all reflecting surfaces of the polygon mirror. With reference to the foregoing, the drawing data is outputted by skipping one surface of the reflecting surfaces of the polygon mirror when the table transferring speed is ½, by skipping three surfaces when the speed is ¼, and by skipping seven surfaces when the speed is ⅛. Thus, the output amount of the data can be changed into four stages in such a manner as to make the output amount of the data per unit time conform with the speed data, without changing the accuracy of the drawing.

Accordingly, when a polygon mirror, having, for example, 6 surfaces is used, one rotation of the polygon mirror is able to scan 6 times when all the reflecting surfaces are used. However, when every other surface is used, the polygon mirror is able to scan three times for one rotation of the polygon mirror, and when every two other surfaces are used, the polygon mirror is able to scan twice for one rotation of the polygon mirror.

Figure 2:
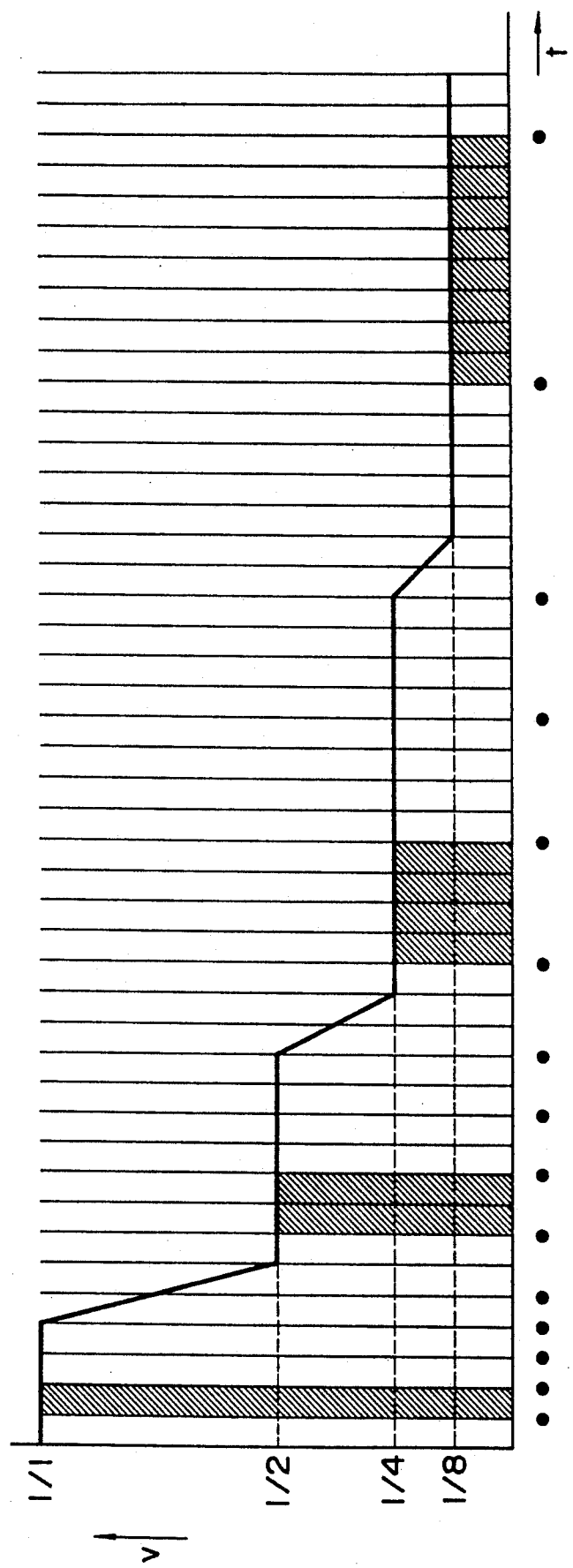
FIG. 2 is a schematic view showing a relation between a transferring speed of a table and a drawing timing.

FIG. 2 shows the principle of the above. In FIG. 2, the horizontal axis shows time t, while the vertical axis shows a transferring speed v of the table. The scales of the horizontal axis show the output timing of a pulse showing the switch-over of the reflecting surfaces of the polygon mirror. Also, the dot below the horizontal axis shows whether the reflecting surface is used for scanning. The surfaces where the dots are drawn, below the horizontal axis, is used for reflecting the laser beam to effect a drawing, and the surfaces where the dots are not drawn is not used for reflecting the laser beam. That is, the laser is intermittently driven by a switch-over pulse while the drawing speed is set to between ⅞ and ½. However, the polygon mirror is rotating under a fixed speed. Therefore, the polygon mirror has effective surfaces which are used for reflecting the laser beam and non-effective surfaces which are not used for reflecting the laser beam.

In the graph, the area surrounded by the horizontal axis, the drawing speed linear line, and the pulse output timing shows the moving amount of the table. As is shown by the shadowed portions in FIG. 2, the moving amount of the table between the surfaces to be used for drawing (the surfaces on which dots are applied under the horizontal axis) are constant in the respective speed. It corresponds to the moving amount between outputs of two pulses of the switch-over pulses in the case of 1/1 scanning, corresponds to the moving amount during an interval of outputting three pulses in the case of ¼ scanning and corresponds to the moving amount during an interval of outputting eight pulses in the case of ⅛ scanning.

The switching of the table speed cannot be effected instantaneously and it requires a predetermined period of time. Therefore, in this system, it is controlled such that the table speed of the switch-over time is gradually changed within the time period of two pulse portions and the speed switch-over is finished after two pulses are outputted when a command is issued.

The space between the scanning lines when the 1/1 speed and the ½ speed are switched includes an error because a drawing is performed during the speed changing. That is, when the transferring speed is changed from 1/1 to ½, the table moving amount between the last drawing of the 1/1 speed and the drawing during the speed changing becomes a ⅞ line portion, while the table moving amount between the drawing during the speed changing and the drawing immediately after it becomes ½ becomes a 9/8 line portion. Thus, a ⅛ error portion is generated. However, such a degree of error is allowed in a generally required accuracy.

FIG. 2 is drawn by taking an example of a case where the table transferring speed becomes gradually slow. When the speed is gradually fast, the speed switching is performed by the same speed linear line by tracing the time axis in the opposite way.

Figure 3:
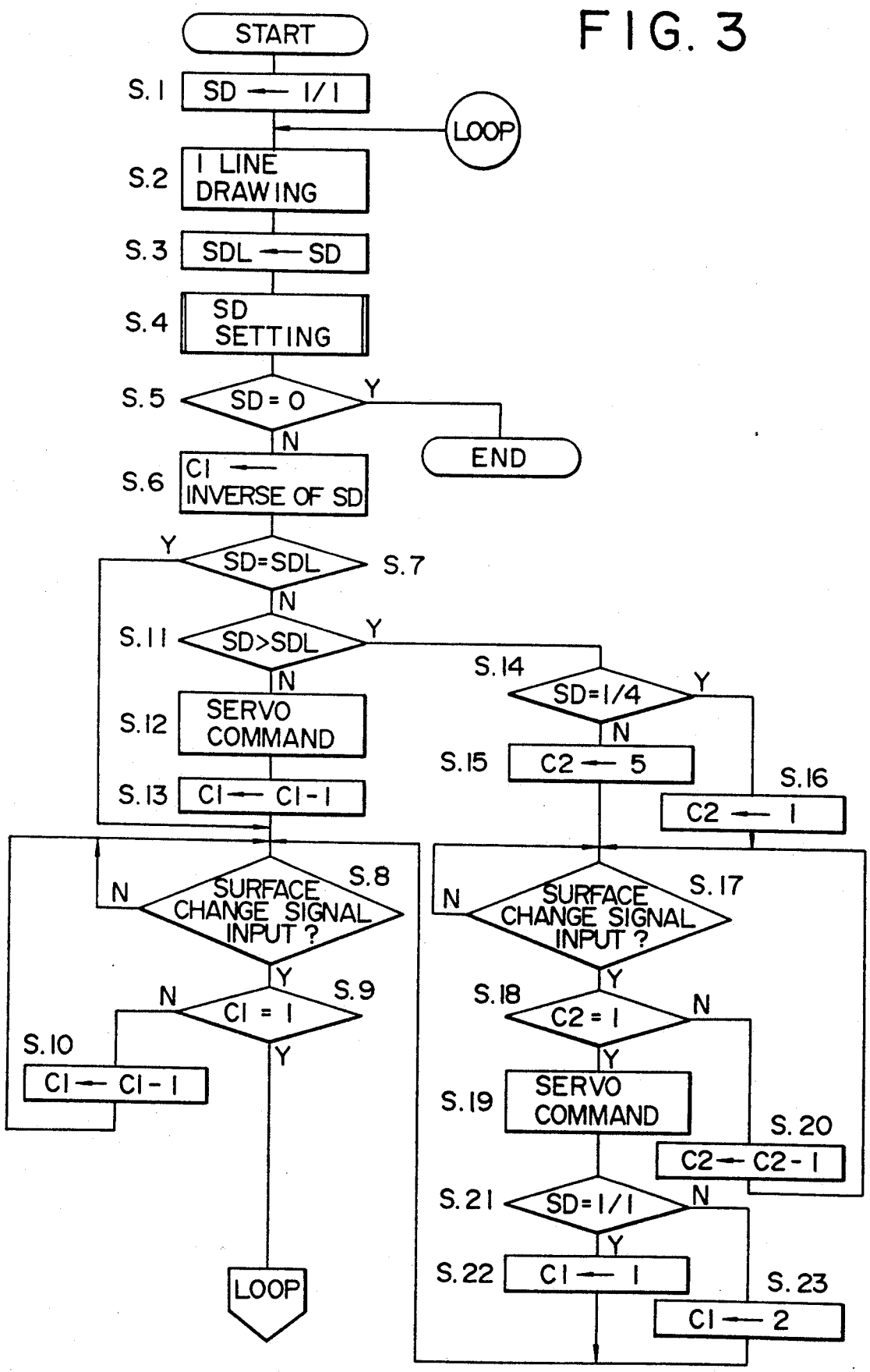
FIG. 3 and FIG. 4 are flow charts showing the function of a drawing controller.

The drawing controller 44 decides the above-mentioned speed data is decided in accordance with a method shown in the flow chart of FIG. 3, based on the output of the counter 30. This flow chart will be described hereinafter.

The initial value of the speed data is established as 1/1 in Step 1 (in FIG. 3, the steps are referred to as "S."), and after drawing one line portion in step 2, a value SD is written in data SDL showing the preceding speed.

Figure 4:
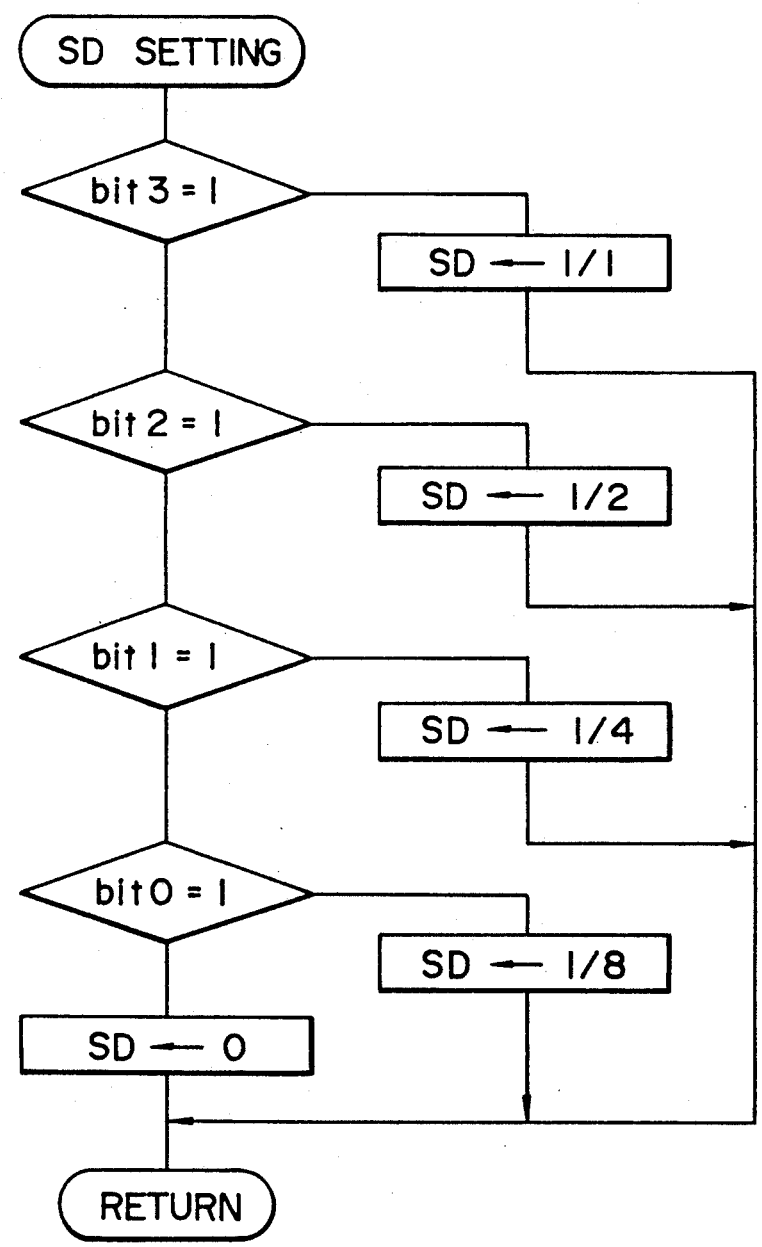

In step 4, the drawing controller carries out the subroutine of the SD establishing procedure, shown in FIG. 4, based on the output of the counter 30. The counter 30 manages the memory remainder as a 4 bit, 16 stage information, as previously described. When bit 3 of the counter is 1, that is, when data is present in the addresses corresponding to $8_H$-$F_H$, the controller judges the data remainder is ½ or more and sets the speed data SD to 1/1.

Similarly, when bit 3 is 0 and bit 2 is 1 (counter: $4_H$-$7_H$ and data remainder: ¼~½), the speed data is set to ½, when the bits 3 and 2 are 0 and bit 1 is 1 (counter: $2_H$-$3_H$ and data remainder: ⅛~¼), the speed data is set to ¼. When bits 3, 2 and 1 are 0 and bit 0 is 1 (counter: $0_H$, $1_H$ and data remainder: ⅛ or less), the speed data is set to ⅛. When all the bits are 0, the speed data is set to 0; that is, a stop command is set.

When the controller finishes the above-mentioned procedure for setting the speed data, the controller, in step 5 of FIG. 3, stops the activation of the laser photo plotter 40 if SD is equal to 0. Otherwise, the controller controls the servo of the table or drawing when SD is not equal to 0.

When SD is not equal to 0, the controller sets an inverse number of SD in a counter C1 for counting a drawing timing in step 6. When SD is not changed, it waits for the switching pulse of the reflecting surface of the polygon mirror being input a predetermined number of times in step 8 to 10 and then returns to step 2 to repeat the procedure. For example, when both SD and SDL are 0, and C1 is initially 2, the drawing procedure is carried out once per two pulses.

When the speed data SD is changed, step 11 determines whether the speed is changed in the increasing side or in the decreasing side.

When the speed is to be changed in the decreasing side, the controller immediately issues a speed decrease serv command to the table driver 43 and decrements C1 before going to step 8 (steps 11-13). By this, when, for example, SD is changed from 1/1 to ½, the scanning is performed even during the speed switching, and when SD is changed from ¼ to ⅛, the scanning is effected only after the 7th switching pulse is outputted.

When the table transferring speed is to be increased, the controller sets the value of counter C2 based on the speed data SD after the change in step 14~step 16. If the speed data after the change is ¼, the value of the counter C2 is 1 and if the speed data is other than ¼, the value of the counter C2 is 5.

The controller waits, in steps 17 to 19, for the switching pulse of the reflecting surface (surface change signal) of the polygon mirror to be inputted a predetermined number of times using the counter C2 and outputs an accelerating command in step 20.

In step 21~step 23, if the value of the speed data after the change is 1/1, the counter C1 is set to 1, and if the value is something else, counter C1 is set to 10 and processing goes to step 8. By this, if SD is changed from ½ to 1/1, scanning is performed during the speed changing operation, and if SD is something else, scanning is effected immediately after the surface switching pulse is inputted two times after the servo command.

As described above according to the present system, as data is accumulated in the intermediate memory, the converted data can be accumulated by operating the raster engine even during the time when the laser photo plotter is not drawing.

As a consequence, the restriction of the activating speed of the plotter due to the capacity of the raster engine is lessened and the activating speed of the whole system can be increased.

Also, as the drawing speed of the system is controlled in such a manner as to correspond to the accumulated data amount of the intermediate memory, the plotter can be continuously activated under the best conditions in accordance with the accumulated data amount of the intermediate memory.

What is claimed is:

1. A plotter system, comprising:
   means for converting image data to raster data;
   an intermediate memory for temporarily storing said converted image data;
   means for drawing an image based upon data outputted from said intermediate memory; and
   means for controlling a drawing speed of said drawing means corresponding to an amount of data remaining in said intermediate memory.

2. The plotter system of claim 1, wherein said intermediate memory comprises a first in, first out type of memory.

3. A plotter system, comprising:
   means for converting image data to raster data;
   an intermediate memory for temporarily storing said converted image data;
   means for drawing an image based upon data outputted from said intermediate memory;
   means for determining an amount of data remaining in said intermediate memory; and
   means for controlling a drawing speed of said drawing means based upon information from said data remaining determining means, such that when an amount of data remaining is large, said drawing speed of said drawing means is increased, while when said amount of data remaining is small, said drawing speed is decreased.

4. The plotter system of claim 1, wherein said data amount detecting means splits an address of said intermediate memory into a plurality of areas and detects the amount of data remaining by judging whether data is in the respective areas.

5. The plotter system of claim 1, wherein said drawing means comprises means for scanning a laser beam onto a drawing object, and means for transferring said drawing object in a direction perpendicular to the scanning direction of said laser beam, said drawing speed control means operating such that a product between a timewise interval of said scanning and a distancewise interval of a table movement becomes constant.

6. The plotter system of claim 5, wherein said scanning means comprises a laser driver for driving a laser, and a polygon mirror driver for reflecting a laser beam from said laser and scanning a drawing object, said drawing speed control means controlling said polygon mirror driver so that a rotation of said polygon mirror becomes constant and changes a driving timing of said laser driver in such a manner as to correspond to said drawing speed.

7. A plotter system, comprising:
   means for converting image data to raster data;
   an intermediate memory for temporarily storing said converted image data;
   means for drawing an image based on data outputted from said intermediate memory;
   data remainder detecting means for detecting an amount of data accumulated in said intermediate memory; and
   means for controlling a drawing speed for increasing the drawing speed of said plot means when the amount of data remaining is large and decreasing the drawing speed when the amount of data remaining is small.

8. The plotter system of claim 7, wherein said intermediate memory comprises a first in, first out type of memory.

9. The plotter system of claim 7, wherein said data amount detecting means splits an address of said intermediate memory into a plurality of areas and detects the amount of data remaining by judging whether data are in respective areas.

10. The plotter system of claim 7, wherein said drawing means comprises means for scanning a laser beam onto a drawing object, and means for transferring said drawing object in a direction perpendicular to the scanning direction of said laser beam, said drawing speed control means operating such that a product between a timewise interval of said scanning and a distancewise interval of a table movement becomes constant.

11. The plotter system of claim 10, wherein said scanning means comprises a laser driver for driving a laser, and a polygon mirror driver for reflecting a laser beam from said laser and scanning a drawing object, said drawing speed control means controlling said polygon mirror driver so that a rotation of said polygon mirror becomes constant and changes a driving timing of said laser driver in such a manner as to correspond to said drawing speed.

12. A plotter system, comprising:
means for converting image data to raster data;
an intermediate memory for temporarily storing said converted image data;
plot means having means for scanning a laser beam onto a drawing object, and means for transferring said drawing object in a direction perpendicular to the scanning direction of said laser beam;
means for detecting an amount of data remaining in said intermediate memory; and
means for controlling a drawing speed for increasing said drawing speed of said plot means when said amount of data remaining is large and decreasing the drawing speed when said amount of data remaining is small, so that a product between a timewise interval of the scanning by said scanning means and a moving speed of said transferring means becomes constant.

13. The plotter system of claim 12, wherein said scanning means comprises a laser driver for driving a laser, a polygon mirror driver for reflecting a laser beam and scanning a drawing object, said drawing speed control means controlling said polygon mirror driver so that a rotation of said polygon mirror becomes constant and changes a driving timing of said laser driver in such a manner as to correspond to said drawing speed.

14. A system for drawing an image, comprising:
means for converting image data to raster data;
means for temporarily storing said converted image data;
a printing device for drawing an image based upon data outputted from said storing means; and
means for controlling said printing device corresponding to an amount of data remaining in said storing means.

15. A system for drawing an image, comprising:
means for converting image data to raster data;
means for temporarily storing said converted image data;
a printing device for drawing an image based upon data outputted from said storing means; and
means for controlling said printing device, wherein said controlling means controls a drawing speed of said printing device in response to an amount of data in said storing means.

16. The system of claim 15, wherein when said amount of data in said storing means is large, said drawing speed of said printing device is increased, while when said amount of data in said storing means is small, said drawing speed of said printing device is decreased.

17. The system of claim 14, wherein said storing means comprises a first in, first out memory.

18. The system of claim 14, wherein said printing device comprises:
means for scanning a laser beam onto a drawing object; and means for transferring said drawing object in a direction perpendicular to a scanning direction of said laser beam.

19. The system of claim 18, wherein said controlling means comprises means for maintaining constant a product between a timewise interval of said scanning and a distancewise interval of a table movement.

* * * * *